(12) United States Patent
Laghi

(10) Patent No.: US 7,360,632 B2
(45) Date of Patent: Apr. 22, 2008

(54) APPARATUS FOR CONTROLLING HYDRAULIC BRAKES IN BICYCLES, MOTORBICYCLES AND THE LIKE

(75) Inventor: Samuele Laghi, Prato (IT)

(73) Assignee: Formula S.r.l., Prato (IT)

( * ) Notice: Subject to any disclaimer, the term of this patent is extended or adjusted under 35 U.S.C. 154(b) by 0 days.

(21) Appl. No.: 11/523,762

(22) Filed: Sep. 18, 2006

(65) Prior Publication Data

US 2007/0056818 A1    Mar. 15, 2007

Related U.S. Application Data

(63) Continuation of application No. 10/925,272, filed on Aug. 24, 2004, now Pat. No. 7,137,492.

(30) Foreign Application Priority Data

Sep. 15, 2003 (IT) .............................. FI2003A0241

(51) Int. Cl.
  B60T 11/10  (2006.01)
  B60T 7/08   (2006.01)
(52) U.S. Cl. ........................................ 188/344; 60/594
(58) Field of Classification Search ............... 188/26, 188/151 R, 344, 152; 60/584, 585, 588, 60/594; 277/464, 465, 490, 399, 400, 438, 277/439, 644, 647, 908, 928, 929
See application file for complete search history.

(56) References Cited

U.S. PATENT DOCUMENTS

| | | | | |
|---|---|---|---|---|
| 2,118,604 A * | 5/1938 | Heidloff | ........................ | 60/588 |
| 2,197,125 A * | 4/1940 | Cox | ........................... | 60/588 |
| 2,211,403 A * | 8/1940 | Boldt et al. | ..................... | 60/588 |
| 2,349,346 A * | 5/1944 | Goepfrich | ...................... | 60/588 |
| 2,878,085 A | 3/1959 | Barnhart | ...................... | 277/438 |
| 3,940,938 A * | 3/1976 | Durham et al. | ............... | 60/588 |
| 4,453,380 A * | 6/1984 | Meynier | ....................... | 60/588 |
| 4,560,049 A | 12/1985 | Uchibaba et al. | ........... | 188/344 |
| 5,636,518 A | 6/1997 | Burgoyne et al. | ............. | 60/594 |
| 6,003,639 A | 12/1999 | Buckley et al. | ............. | 188/344 |
| 6,318,514 B1 | 11/2001 | Hinkens et al. | .......... | 188/73.38 |
| 6,651,429 B2 * | 11/2003 | Ishiwata et al. | .............. | 60/588 |
| 6,804,961 B2 | 10/2004 | Lumpkin | ...................... | 60/588 |
| 7,114,335 B2 * | 10/2006 | Becocci et al. | ............... | 60/588 |
| 7,137,492 B2 * | 11/2006 | Laghi | ......................... | 188/344 |

(Continued)

FOREIGN PATENT DOCUMENTS

DE    197 18 612 A    11/1998

(Continued)

*Primary Examiner*—Thomas Williams
(74) *Attorney, Agent, or Firm*—Ladas & Parry LLP

(57) ABSTRACT

Apparatus for controlling brakes in bicycles and the like, to be used, in particular, for disc brakes mounted on bicycles, with a pump (8) connected with a relevant reservoir (88) for the fluid of the hydraulic circuit, and comprising a piston (89) sliding within a relevant chamber (80) provided with one or more ports (83, 84) for connection with said reservoir (88), said piston being so shaped as to close/open said ports (83, 84) upon its displacement along said chamber (80), the apparatus being characterized in that the idle stroke of the piston (89) inside the said chamber (80) is adjustable by a rotation of the same piston (89) about its longitudinal axis.

11 Claims, 4 Drawing Sheets

U.S. PATENT DOCUMENTS

| | | | |
|---|---|---|---|
| 7,222,703 B2 * | 5/2007 | Laghi et al. | 188/344 |
| 2003/0121262 A1 | 7/2003 | Lumpkin | 60/594 |
| 2003/0121739 A1 | 7/2003 | Lumpkin | 188/344 |
| 2005/0056110 A1 | 3/2005 | Laghi et al. | 74/489 |
| 2005/0115238 A1 | 6/2005 | Beccci et al. | 60/584 |

FOREIGN PATENT DOCUMENTS

| | | |
|---|---|---|
| DE | 200 18 705 U1 | 2/2001 |
| EP | 0 601 769 A | 6/1994 |
| EP | 1 160 152 A1 | 12/2001 |
| EP | 1 514 791 A1 | 3/2005 |
| IT | 0218037 | 3/1992 |

\* cited by examiner

APPARATUS FOR CONTROLLING HYDRAULIC BRAKES IN BICYCLES, MOTORBICYCLES AND THE LIKE

CROSS-REFERENCE TO RELATED APPLICATIONS

This application is a continuation of U.S. application Ser. No. 10/925,272 filed on Aug. 24, 2004 now U.S. Pat. No. 7,137,492 which claims priority from Italian Application FI2003A000241 filed on Sep. 15, 2003.

The present invention refers to an apparatus for controlling hydraulic brakes in bicycles, motorcycles and the like.

It is known that in a hydraulic disc brake for bicycles or motorcycles, the action exerted on the brake's lever is transmitted to the caliper acting on the disc via a hydraulic connection which exerts on the same caliper a force generated by a pump activated by said lever.

A drawback of the devices which control the hydraulic brakes of known type lies in the relative difficulty of adjusting the idle stroke of the control lever. In fact, in the existing devices, the lever is connected to a piston sliding into a respective chamber exhibited by the pump. In order to adjust the idle stroke of the lever it is currently necessary to move axially the piston with respect to the chamber inside which it slides. This approach is however very complex constructionally and affects negatively the constructional simplicity of the device and its robustness upon use, besides raising the relevant production cost thereof.

A further drawback exhibited by the traditional brake-controlling devices relates to the fact that the reservoir of the brake's pump, usually held in a body of cylindrical shape, is applied to the handlebar, thereby making up an element by itself. This characteristic may result unsuitable inasmuch as it brings about larger dimensions of the handlebar, the said reservoir making up a component that can be damaged by collisions and tampering and being a danger for the user in case of falls.

The main object of the present invention is to provide a brake-controlling apparatus which can be easily adjusted. A further object of the present invention is to eliminate the drawbacks deriving from the exposure of the reservoirs to possible collisions and/or tampering.

This result has been achieved, according to the invention, by adopting the idea of making an apparatus having the characteristics disclosed in the claim 1. Further characteristics being set forth in the dependent claims.

Among the advantages of the present invention there is the fact that no protruding parts are provided which can be damaged or be a danger for the cyclist; that the apparatus has extremely limited overall dimensions and, therefore, gives the handlebar a greater compactness; that a more attractive appearance is conferred to the handlebar; that it is possible to adjust the idle stroke of the lever with greatest ease; that the braking maintains optimal performance; that the apparatus keeps its characteristics unchanged also after a prolonged service life.

These and other advantages and characteristics of the invention will be best understood by anyone skilled in the art from a reading of the following description in conjunction with the attached drawings given as a practical exemplification of the invention, but not to be considered in a limitative sense, wherein.

Figure 1:
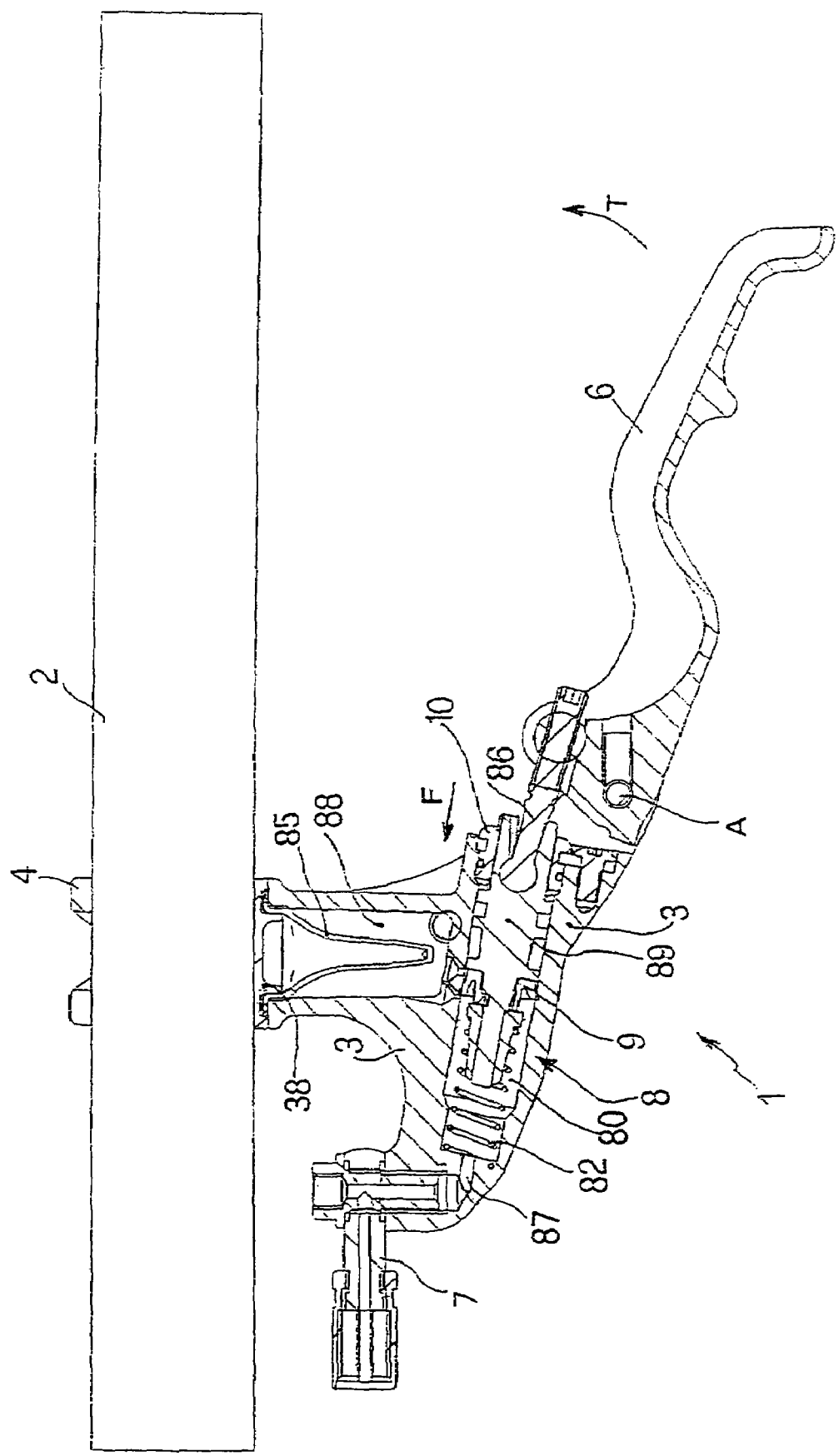
FIG. 1 shows a view in longitudinal section of a possible embodiment of an apparatus for controlling hydraulic brakes according to the invention, in association with a portion of the handlebar.

With reference to the example shown in the attached figures, an apparatus 1 according to the present invention can be associated with a bicycle's handlebar represented in FIG. 1 by a portion of a tubular body 2.

The present apparatus comprises a body 3 having concave, substantially semicylindrical surface 30 and so shaped as to be complementary with the profile of the tubular element of the handlebar 2. On the body 3, on either side of said surface 30, there are provided seats 39 for receiving corresponding screws 5 allowing the attachment of the apparatus 1 to the handlebar 2.

The apparatus 1 also comprises a semicollar 4 having a concavity 40 of substantially semicylindrical shape so as to match complimentarily with the handlebar 2. Provided on the semicollar 4 are through holes to receive screws 5 for the engagement of the semicollar 4 and the body 3, thereby determining a stable attachment of the apparatus 1 to the handlebar 2.

As best described later on with reference to the example illustrated by the figures of the accompanying drawings, the said body 3 comprises a cavity 88 defining a reservoir for the fluid of the hydraulic circuit. The said reservoir 88 results positioned between the handlebar, to which the body 3 is ensured, and a brake-operating lever 6.

The apparatus 1 further comprises a lever 6 for the operation of the pump acting on the hydraulic circuit of the braking system. The lever 6 is pivoted to the body 3 in correspondence of the axis indicated by A in FIG. 1. In the figures, a conduit 7 can be seen which makes part of the hydraulic circuit and connects the apparatus 1 to the caliper (not shown) acting on the brake's disc. The conduit 7 is connected downstream of a pump 8 to an outlet port 87 through which the fluid is forced into the hydraulic circuit upon activation of the brake. The pump 8 is defined by a chamber 80 within the body 3, and inside which a piston 89 is made to slide. The piston 89 is connected to the lever 6 via a connecting rod 86 having spherical head and located, with respect to the piston, on the side opposite to that in which the port 87 is positioned within the chamber 80. The actuation of the lever 6 (as indicated by the arrow T in FIG. 1) is cause for the displacement of the piston 89 (from the right to the left, with reference to arrow F in FIG. 1) towards the port 87. The return of the piston 89 to the rest position is determined by a spring 82 whose reaction is exerted in a direction opposite to that indicated by arrow F in FIG. 1.

Figure 2:
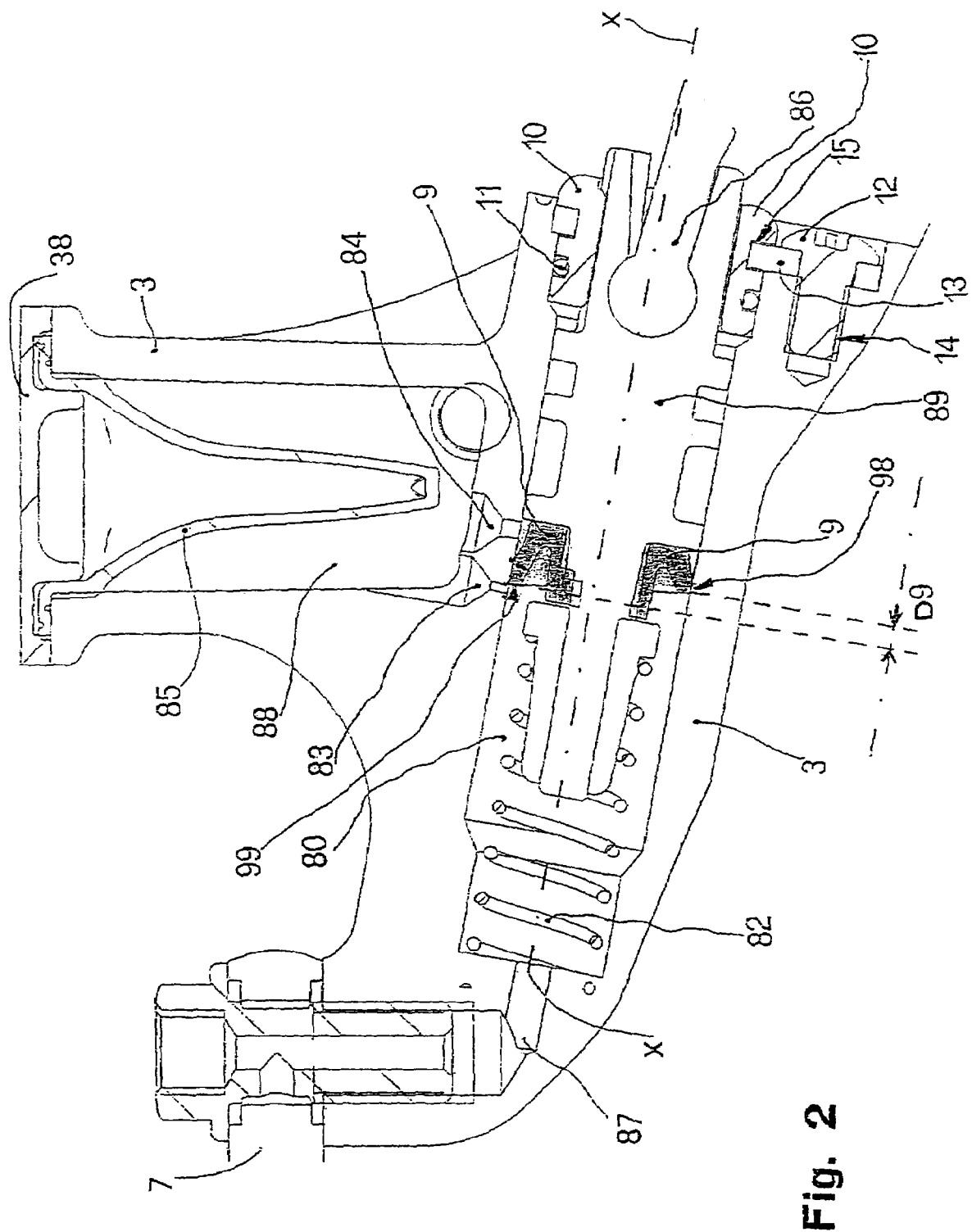
FIG. 2 is an enlarged detail of the embodiment of FIG. 1, in which some lines in the drawing have been omitted for the sake of simplicity.

As best visible in FIG. 2, keeping the piston 89 within the chamber 80 is ensured by the presence of the bush 10 provided with a relevant gasket 11. The bush is fixed to the body 3 of the apparatus by a screw 12. The screw 12 is screwed into a corresponding seat 14 provided in the body 3 and passed through a connecting drilled element 13 which is fitted in a groove 15 formed in the bush 10.

Figure 3:
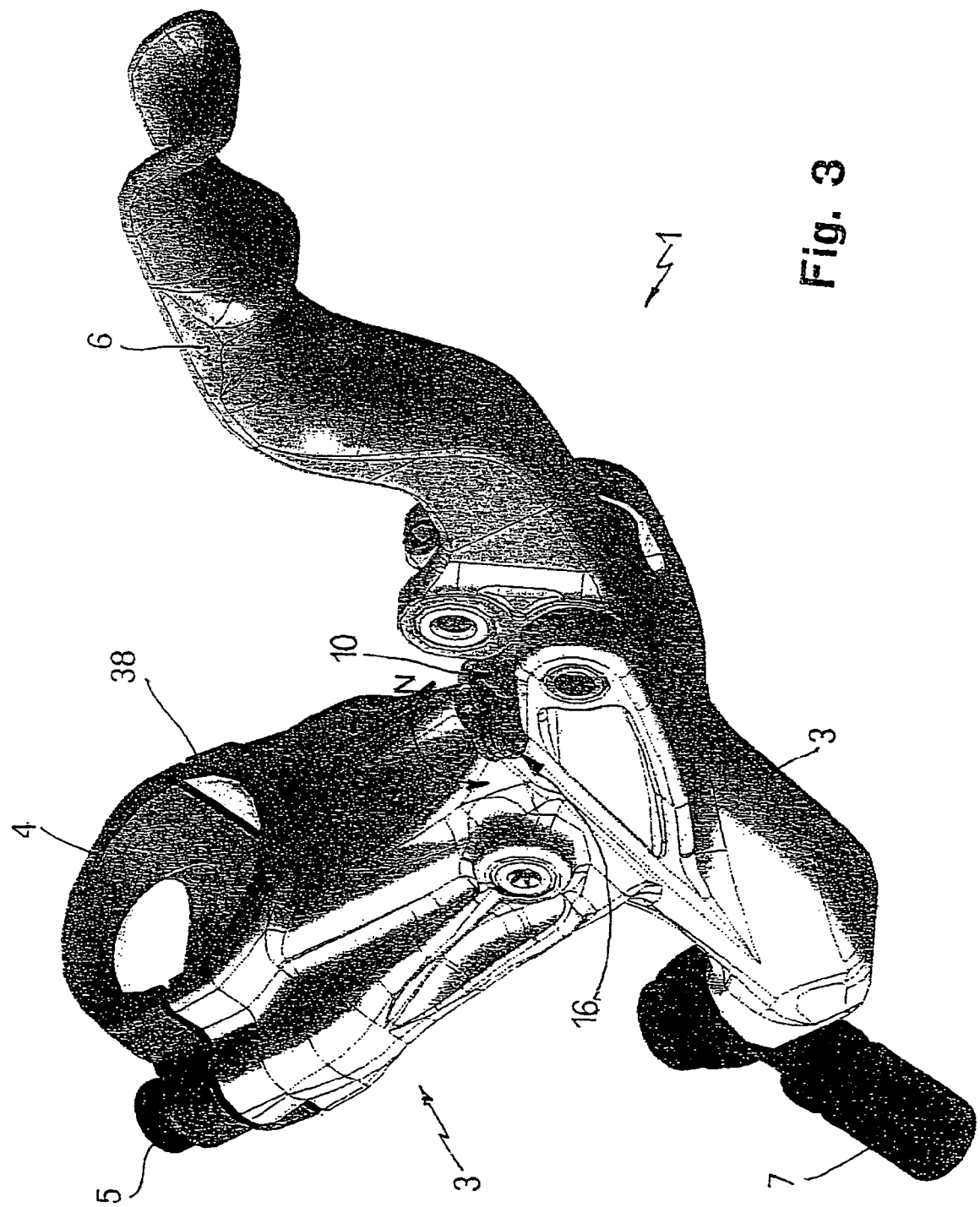
FIG. 3 is a perspective view from below of the apparatus of FIG. 1.
Figure 4:
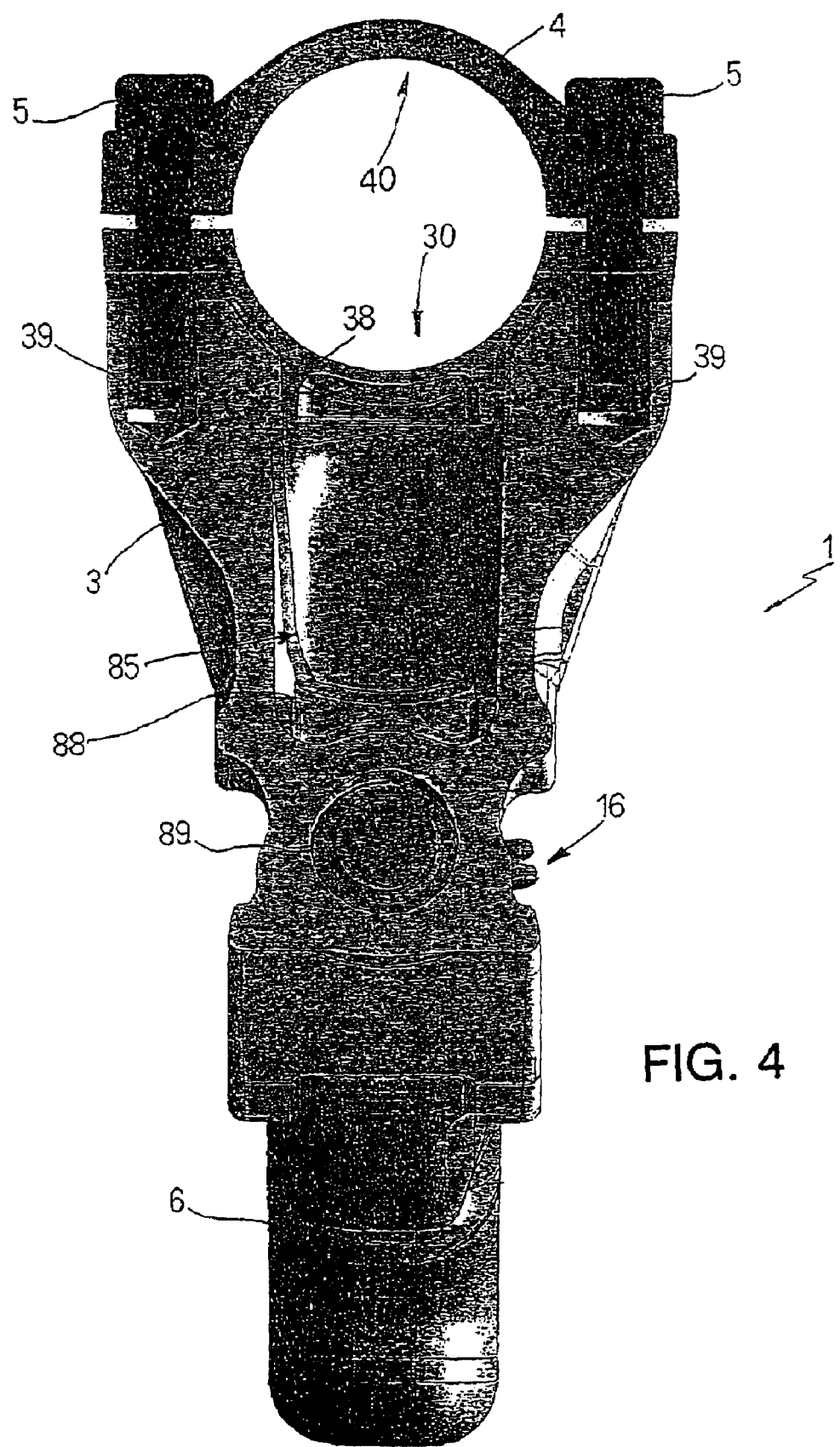
FIG. 4 is a cross-section view of the apparatus of the previous figures.

The bush 10 is solid to the piston 89 and, for this reason, the piston 89 can rotate together with the bush 10 with respect to the chamber 80. Solid to the bush 10 is a knob 16 (shown in FIGS. 3 and 4) disposed radially to the longitudinal development of the chamber 80, that is, substantially orthogonal to the axis X-X of chamber 80. The rotation of the knob 16 (see arrow N in FIG. 3) causes a corresponding rotation of the piston 89 within the chamber 80.

The chamber 80 is connected with the said reservoir 88 via two ports 83 and 84, which are disposed in a region interested by the piston upon its sliding. Through the ports 83 and 84, in a manner known per se, the fluid is made to pass bidirectionally between the reservoir 88 and the chamber 88 during the axial movement of the piston 89, that is, during the operation of the pump 8.

Fitted on the piston 89 is a gasket 9 having circumferential development. The gasket 9 exhibits, along its circumferential profile, a variable extension in the axial direction. In practice, the gasket 9 has a height varying along its longitudinal development. In FIG. 2, D9 indicates the difference in height between the extent of the overlying edge 99, and the corresponding extent of the underlying edge 98. In other words, the plane of said edges 98, 99 forms an acute angle, that is, an angle other than 90°, with said axis X-X.

This particular shaping of the gasket 9 is cause for a different interaction between the piston 89 and the ports 83, 84 of the reservoir 88. Stated differently, the interaction front of the gasket 9 with the ports 83 and 84 is displaced in the axial direction; in practice, by the rotation in one direction or in the opposite direction of piston 89 (obtainable through the knob 16), the gasket 9 closes either in advance or with delay the port 83, that is, before or after the braking command. An adjustment of the idle stroke of the lever 6 is thus obtained with an extremely simple and effective solution. The reservoir 88 is defined by a corresponding cavity provided in the body 3 of the apparatus 1. Provided inside the reservoir 88 is a traditional, compensating rubber membrane 85. On top, the reservoir is closed by a lid 38. The lid 38 is crossed by screws 5 which fix the apparatus 1 to the handlebar 2.

Moreover, the conformation of the lid 38 is concave so as to complimentarily match the profile of handlebar's tube 2.

This characteristic allows accommodating the reservoir 88 in a stable manner over a region protected against collisions and tampering.

Practically, the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

The invention claimed is:

1. An apparatus for controlling brakes in bicycles, said bicycles comprising a hydraulic circuit, a reservoir for fluid of the hydraulic circuit, and a pump connected with the reservoir, the apparatus comprising
   a piston sliding within a chamber associated with the piston,
   the chamber comprising at least a first port for connection with said reservoir and an outlet port through which the fluid is forced into the hydraulic circuit upon activation of the brake,
   the piston comprising a gasket shaped to close/open said first port upon a stroke of the piston along said chamber,
   the gasket comprising an edge defining a front of interaction with said first port,
   the edge of the gasket offering a different distance between the front of interaction and said first port in correspondence of a rotation of the gasket about a longitudinal axis of said chamber.

2. The apparatus according to claim 1, wherein said piston is provided with an operable knob allowing rotation of the gasket relative to the chamber.

3. The apparatus according to claim 1, the distance between said edge of the gasket and said first port defines an idle stroke of the piston.

4. A cylinder for a hydraulic disc brake of a bicycle, the cylinder comprising:
   a chamber comprising a first end and a second end along an axis of said chamber;
   a hydraulic fluid reservoir with a port between the hydraulic fluid reservoir and the chamber, the port comprising a port opening between the first end and the second end of said chamber;
   a piston comprising a gasket, the gasket comprising a gasket edge defining an interaction front with said port opening, the gasket edge being movable relative to the port opening to vary a distance between the gasket edge and the port opening;
   a lever pivotably associated with a cylinder body and operatively associated with the piston for movement of the piston along an axial direction of the chamber as the lever is actuated between a rest position and an actuated position; and
   adjustment means of an idle stroke of the piston, operatively associated with the piston for moving the gasket edge to adjust a distance between the port opening and the gasket edge without varying an axial position of the piston.

5. The cylinder according to claim 4, wherein said adjustment means adjust a distance between the port opening and the gasket edge without varying a rest position of the lever.

6. The cylinder according to claim 4, wherein said adjustment means comprise means to rotate the piston within the chamber, the gasket edge offering a different front of interaction with said port opening in correspondence of a rotation of the piston about a longitudinal axis of said chamber.

7. The cylinder according to claim 6, in which said means to rotate the piston within the chamber comprise an operable knob.

8. The cylinder according to claim 4, wherein the piston is connected with the lever via a connecting rod comprising a spherical head.

9. The cylinder according to claim 4, comprising a lever position adjustment.

10. A method of varying an idle stroke of a piston of a lever-actuated bicycle hydraulic disc brake cylinder, the disc brake cylinder comprising a chamber having a longitudinal axis and defining a port, the piston being received in the chamber, the piston comprising a gasket, wherein a distance between an edge of the gasket and the port defines the idle stroke of the piston, the lever being a one-piece lever and being operatively associated with the piston, the method comprising:
    varying the idle stroke of the piston while maintaining a piston axial position.

11. The method according to claim 10, wherein the idle stroke of the piston is varied by rotation of the gasket.

* * * * *